(12) United States Patent
Cresp et al.

(10) Patent No.: US 9,146,622 B2
(45) Date of Patent: Sep. 29, 2015

(54) DYNAMICALLY UPDATING A SMART PHYSICAL KEYBOARD

(75) Inventors: Jacques Cresp, Saint-Jeannet (FR); Fabrice Livigni, Montauroux (FR); Richard Sert, Frejus (FR); Alain Siles, Vence (FR); Joel Viale, Vence (FR)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/531,834

(22) Filed: Jun. 25, 2012

(65) Prior Publication Data

US 2013/0342467 A1    Dec. 26, 2013

(51) Int. Cl.
G06F 3/02       (2006.01)
G06F 3/023      (2006.01)
H04L 29/08      (2006.01)

(52) U.S. Cl.
CPC .............. *G06F 3/0238* (2013.01); *H04L 67/14* (2013.01)

(58) Field of Classification Search
CPC ..... G06F 3/018; G06F 3/0238; G06F 9/4445; G06F 9/4448; H01H 13/83
USPC .......... 345/168–172; 710/62, 65, 67; 715/751
See application file for complete search history.

(56) References Cited

U.S. PATENT DOCUMENTS

| | | | |
|---|---|---|---|
| 5,606,674 A * | 2/1997 | Root ............................. | 715/769 |
| 6,469,713 B2 * | 10/2002 | Hetherington et al. ....... | 715/740 |
| 7,646,316 B2 | 1/2010 | Khoo | |
| 7,925,497 B2 * | 4/2011 | Takahashi ........................ | 704/8 |
| 8,479,112 B2 * | 7/2013 | Clow et al. .................... | 715/773 |
| 8,484,012 B2 * | 7/2013 | Takahashi ........................ | 704/8 |
| 2002/0054097 A1 * | 5/2002 | Hetherington et al. ........ | 345/762 |
| 2002/0138656 A1 * | 9/2002 | Hickey .......................... | 709/250 |
| 2003/0046670 A1 * | 3/2003 | Marlow ......................... | 717/140 |
| 2004/0210841 A1 * | 10/2004 | Takahashi ..................... | 715/536 |
| 2004/0230912 A1 * | 11/2004 | Clow et al. .................... | 715/773 |
| 2005/0024340 A1 * | 2/2005 | Bathiche ....................... | 345/170 |
| 2006/0047499 A1 * | 3/2006 | Chen et al. ........................ | 704/8 |
| 2007/0061750 A1 * | 3/2007 | Schultz et al. ................ | 715/771 |
| 2008/0275692 A1 * | 11/2008 | Chen et al. ........................ | 704/8 |
| 2008/0275693 A1 * | 11/2008 | Chen et al. ........................ | 704/8 |
| 2009/0058823 A1 | 3/2009 | Kocienda | |
| 2010/0321299 A1 | 12/2010 | Shelley et al. | |
| 2011/0137637 A1 * | 6/2011 | Takahashi ......................... | 704/8 |
| 2011/0179372 A1 | 7/2011 | Moore et al. | |
| 2011/0285656 A1 * | 11/2011 | Yaksick et al. ............... | 345/173 |
| 2012/0017161 A1 | 1/2012 | Hirshberg | |
| 2012/0023401 A1 | 1/2012 | Arscott et al. | |
| 2013/0326347 A1 * | 12/2013 | Albright et al. ............... | 715/265 |

OTHER PUBLICATIONS

Godwin-Jones. "Emerging Technologies Mobile Apps for Language Learning". Language Learning & Technology. Jun. 2011. vol. 15, No. 2. pp. 2-11. http://llt.msu.edu/issues/june2011/emerging.pdf. ISSN 1094-3501.

Weidong Shi et al. "SHARC: A scalable 3D graphics virtual appliance delivery framework in cloud". Journal of Network and Computer Applications 34 (2011). pp. 1078-1087. Copyright 2010 Published by Elsevier Ltd. doi:10.1016/j.jnca.2010.06.005.

* cited by examiner

*Primary Examiner* — Gene W Lee
(74) *Attorney, Agent, or Firm* — Jinesh Patel

(57) ABSTRACT

Embodiments of the present invention provide a system, method, and program product for dynamically updating an input language of a smart physical keyboard. A local computer receives an indication that a remote session has been started, where starting the remote session includes the local computer accessing a remote computer. The local computer determines a keyboard input language for the remote session. The local computer then updates one or more keys of a smart physical keyboard to display the keyboard input language for the remote session.

15 Claims, 6 Drawing Sheets

DYNAMICALLY UPDATING A SMART PHYSICAL KEYBOARD

FIELD OF THE INVENTION

The present invention relates generally to keyboard input languages, and more particularly to a method for dynamically updating the keyboard input language of a smart physical keyboard.

BACKGROUND

A smart physical keyboard is a hardware device that uses LED or ePaper technology to graphically display a character on each key as opposed to a physical keyboard where the characters are painted or physically written onto each key. Keys of a smart physical keyboard are accessed in a similar manner as the keys of a physical keyboard. However, the keyboard layout of a smart physical keyboard, i.e., the character graphically displayed on each key, can be changed or updated by accessing and changing the keyboard input language.

A keyboard input language is software that denotes the specific layout of a keyboard. A keyboard device driver uses the keyboard input language as a way to map from a specific keystroke to a specific character. Keyboard input languages may vary from country to country. The most common keyboard input language is the "QWERTY" layout. Other common keyboard input languages include the "QWERTZ" layout and the "AZERTY" layout. A user may install multiple keyboard input languages on their computing device and manually switch between the keyboard input languages as needed. Having multiple keyboard input language on a single computing device can be useful if a user is interested in typing in a foreign language that features keys that are not present on a standard "QWERTY" layout, or if the user wishes to type using the keyboard layout which the user is more familiar with. However, switching manually between keyboard input languages can be quite tedious, especially if the user desires to frequently move back and forth between the languages.

SUMMARY

Embodiments of the present invention provide a system, method, and program product for dynamically updating an input language of a smart physical keyboard. A local computer receives an indication that a remote session has been started, where starting the remote session includes the local computer accessing a remote computer. The local computer determines a keyboard input language for the remote session. The local computer then updates one or more keys of a smart physical keyboard to display the keyboard input language for the remote session.

DETAILED DESCRIPTION

Embodiments of the present invention will now be described in detail with reference to the accompanying Figures.

Figure 1:
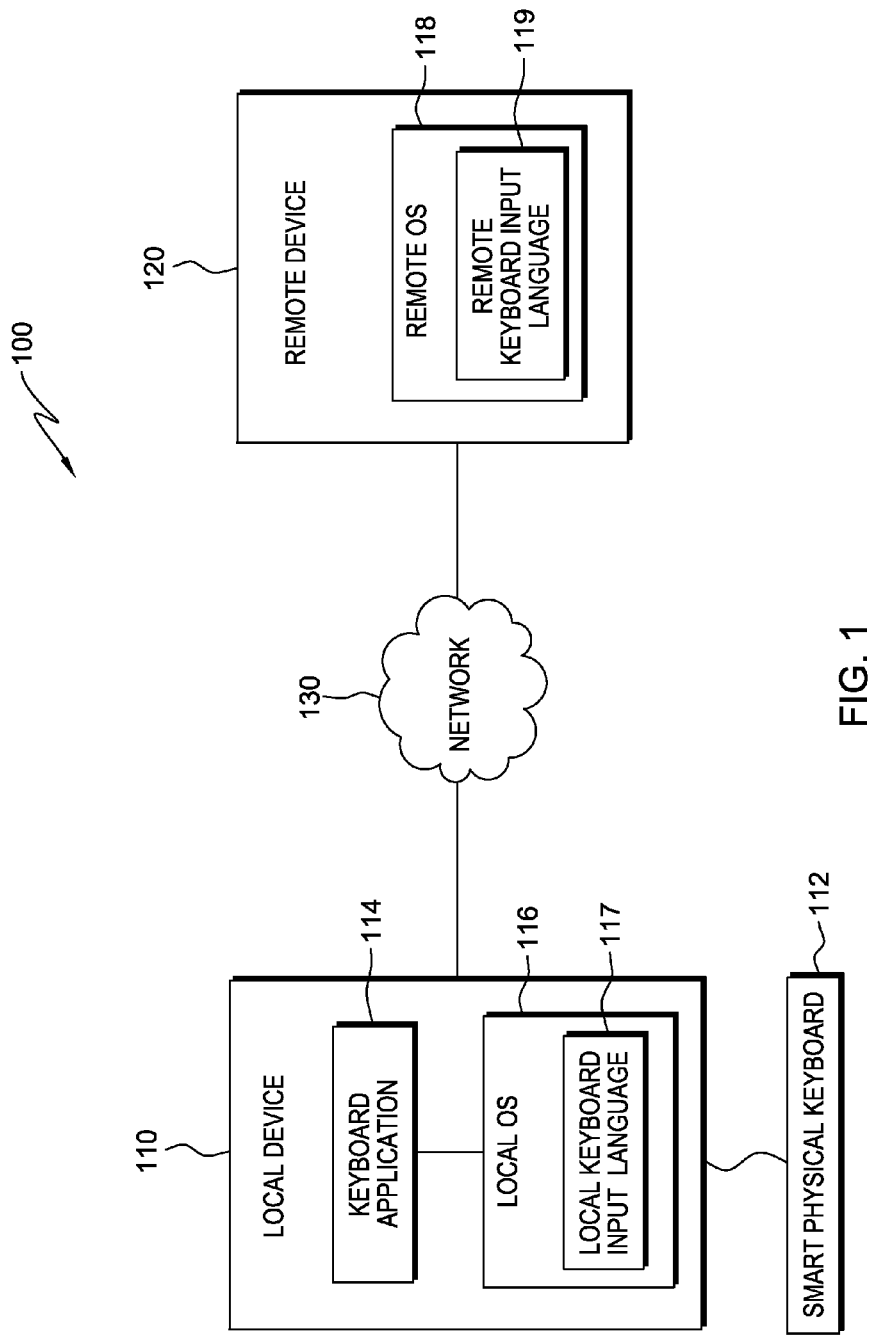
FIG. 1 illustrates a dynamic smart physical keyboard updating system, in accordance with an embodiment of the invention.

FIG. 1 illustrates a dynamic smart physical keyboard updating system 100, in accordance with an embodiment of the invention. Dynamic smart physical keyboard updating system 100 includes local device 110 and remote device 120 interconnected by network 130.

In an exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between local device 110 and remote device 120.

Remote device 120 includes remote operating system (OS) 118. Although not shown, optionally, remote device 120 can include a cluster of web servers executing the same software to collectively process requests as distributed by a front end server and a load balancer. Remote device 120 may be a desktop computer, a notebook, a laptop computer, a tablet computer, a handheld device, a smart-phone, a thin client, or any other electronic device or computing system capable of receiving and sending data to and from local device 110 via network 130. In an exemplary embodiment, remote device 120 is a computing device that is optimized to manage requests for remote access to remote OS 118, received from other computing devices via network 130. Remote device 120 is described in more detail with reference to FIG. 5.

Remote OS 118 includes remote keyboard input language 119. Remote OS 118 may be Microsoft Windows™, Mac OS X™, Linux™, or any other operating system capable of processing requests for information created locally by remote device 120 and also capable of processing remote requests or being accessed remotely (e.g., SSH, telnet) by a computing device, such as local device 110, via network 130.

Remote keyboard input language 119 is the keyboard input language used by remote OS 118 when mapping from a keystroke to a specific character. In general, the keyboard input language of an operating system describes the specific keyboard layout being used by the operating system. For example, if remote keyboard input language 119 is set to the "AZERTY" layout, and the alphabetic character in the top left corner is pressed on a keyboard connected to remote device 120, remote OS 118 will use the "AZERTY" layout specified by the remote keyboard input language to map the keystroke to an "A".

Local device 110 includes keyboard application 114, local operating system (OS) 116 and smart physical keyboard 112.

Local device 110 may be a desktop computer, a notebook, a laptop computer, a tablet computer, a handheld device, a smart-phone, a thin client, or any other electronic device or computing system capable of receiving and sending data to and from remote device 120 via network 130. In an exemplary embodiment, local device 110 is a computing device that is optimized and capable of remotely accessing other computing devices, such as remote device 120, via network 130. Local device 110 is described in more detail with reference to FIG. 5.

Local OS 116 includes local keyboard input language 117. Local OS 116 may be Microsoft Windows™, Mac OS X™, Linux™, or any other operating system capable of processing requests for information created locally by local device 110 and also capable of initiating a remote session or remotely accessing (e.g., SSH, telnet) another computing device, such as remote device 120, via network 130.

Local keyboard input language 117 is the keyboard input language used by local OS 116 when mapping from a keystroke to a specific character. In general, the keyboard input language of an operating system describes the specific keyboard layout being used by the operating system. For example, if local keyboard input language 117 is set to the "QWERTY" layout, and the alphabetic character in the top left corner is pressed on a keyboard connected to local device 110, local OS 116 will use the "QWERTY" layout specified by the local keyboard input language to map the keystroke to a "Q".

Smart physical keyboard 112 is an external hardware device that receives input directly from a user and provides output to an operating system. In an exemplary embodiment, smart physical keyboard 112 receives input directly via user keystrokes and provides output to local OS 116. Smart physical keyboard 112 is similar to a physical keyboard except the characters of the keyboard are graphically displayed on each key rather than being physically written on each key like a typical physical keyboard. In an exemplary embodiment, smart physical keyboard 112 uses LED or ePaper technology to graphically display each character on each key.

Keyboard application 114, the operation of which is explained in greater detail below with respect to FIGS. 2-5, operates to retrieve the relevant keyboard input language in order to dynamically update the graphical representation of smart physical keyboard 112 to match the keyboard layout described by the retrieved keyboard input language. In an exemplary embodiment, when local device 110 initiates a remote session with remote device 120, keyboard application 114 retrieves remote keyboard input language 119 and stores the remote keyboard input language in local cache along with a process identifier assigned to the remote session by local OS 116. Keyboard application 114 then updates the graphical representation of smart physical keyboard 112 to display a keyboard layout that matches remote keyboard input language 119 for use when the remote session is the active window.

Figure 2:
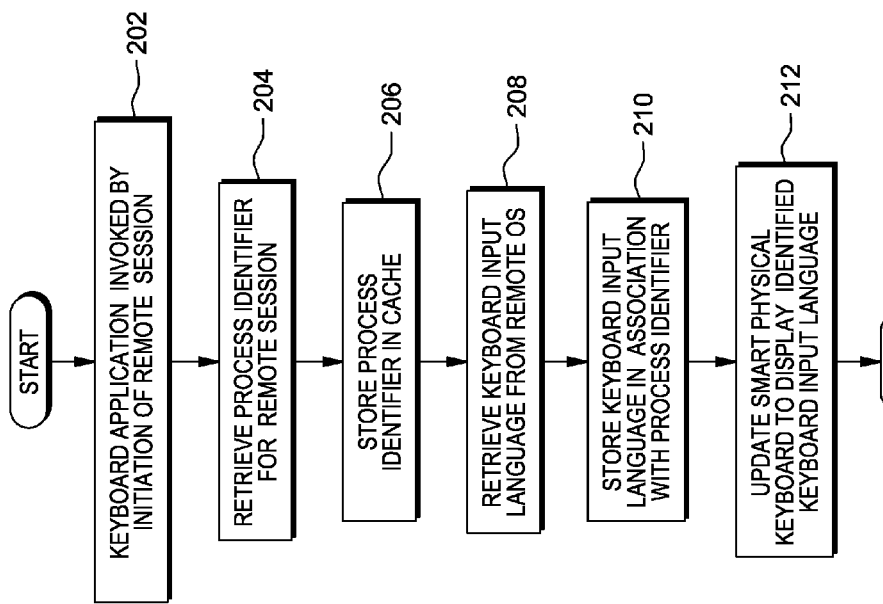
FIG. 2 is a flowchart illustrating the operations of a keyboard application for retrieving and storing a process identifier and a keyboard input language for an initiated remote session, in accordance with an embodiment of the invention.

FIG. 2 is a flowchart illustrating the operations of keyboard application 114 in retrieving and storing a process identifier and a keyboard input language for an initiated remote session, in accordance with an exemplary embodiment of the invention. In an exemplary embodiment, keyboard application 114 is invoked when a remote session with remote device 120 is initiated by local device 110 via network 130 (step 202). In another embodiment, keyboard application 114 is invoked when local OS 116 is launched or initiated by local device 110.

In an exemplary embodiment, keyboard application 114 retrieves the process identifier assigned to the initiated remote session by local OS 116 (step 204). A process identifier is a device unique identifier assigned to a process by an operating system. Once the process ends, e.g., a window or application is closed; the process is no longer linked to the assigned process identifier. Keyboard application 114 then stores the retrieved process identifier for the remote session in local cache (step 206). While in an exemplary embodiment, keyboard application 114 retrieves the process identifier assigned to the initiated remote session, in other embodiments, keyboard application can retrieve any unique identifier used to identify the remote session.

Keyboard application 114 retrieves the keyboard input language for the remote session (step 208). In an exemplary embodiment, remote keyboard input language 119 is retrieved from remote OS 118. In an exemplary embodiment, retrieval of remote keyboard input language 119 is accomplished by extending remote session protocols or through a client-server mechanism. In another embodiment, only a keyboard input language identifier for the remote session is retrieved from remote OS 118, wherein all relevant keyboard input languages are stored on local device 110 and each keyboard input language has a universally-unique keyboard input language identifier. Keyboard application 114 uses the keyboard input language identifier to identify and retrieve the relevant keyboard input language from memory.

In an exemplary embodiment, keyboard application 114 stores remote keyboard input language 119 in local cache in association with the process identifier stored in step 206 (step 210). Storing remote keyboard input language 119 in association with the process identifier allows keyboard application 114 to quickly identify the proper keyboard input language if the remote session is minimized (no longer the active window) and then subsequently restored as the active window. In an exemplary embodiment, it is important to note that the process identifier and remote keyboard input language are only stored temporarily. Once the remote session ends, the process identifier for the remote session and the remote keyboard input language are deleted. In addition, while in an exemplary embodiment the process identifier and remote keyboard input language are stored in local cache, in other embodiments, they may be stored in other local memory, an external memory device, remote memory device or any other compatible memory device. In another embodiment, only the keyboard input language identifier for remote keyboard input language 119 is stored in local cache in association with the process identifier stored in step 206.

Keyboard application 114 updates smart physical keyboard 112 to display the keyboard layout described by remote keyboard input language 119 until the initiated remote session is no longer the active window (step 212). In another embodiment, keyboard application 114 uses the stored keyboard input language identifier to determine the relevant keyboard input language, which is remote keyboard input language 119. Keyboard application 114 updates smart physical keyboard 112 to display the keyboard layout described by remote keyboard input language 119 until the initiated remote session is no longer the active window.

Figure 3:
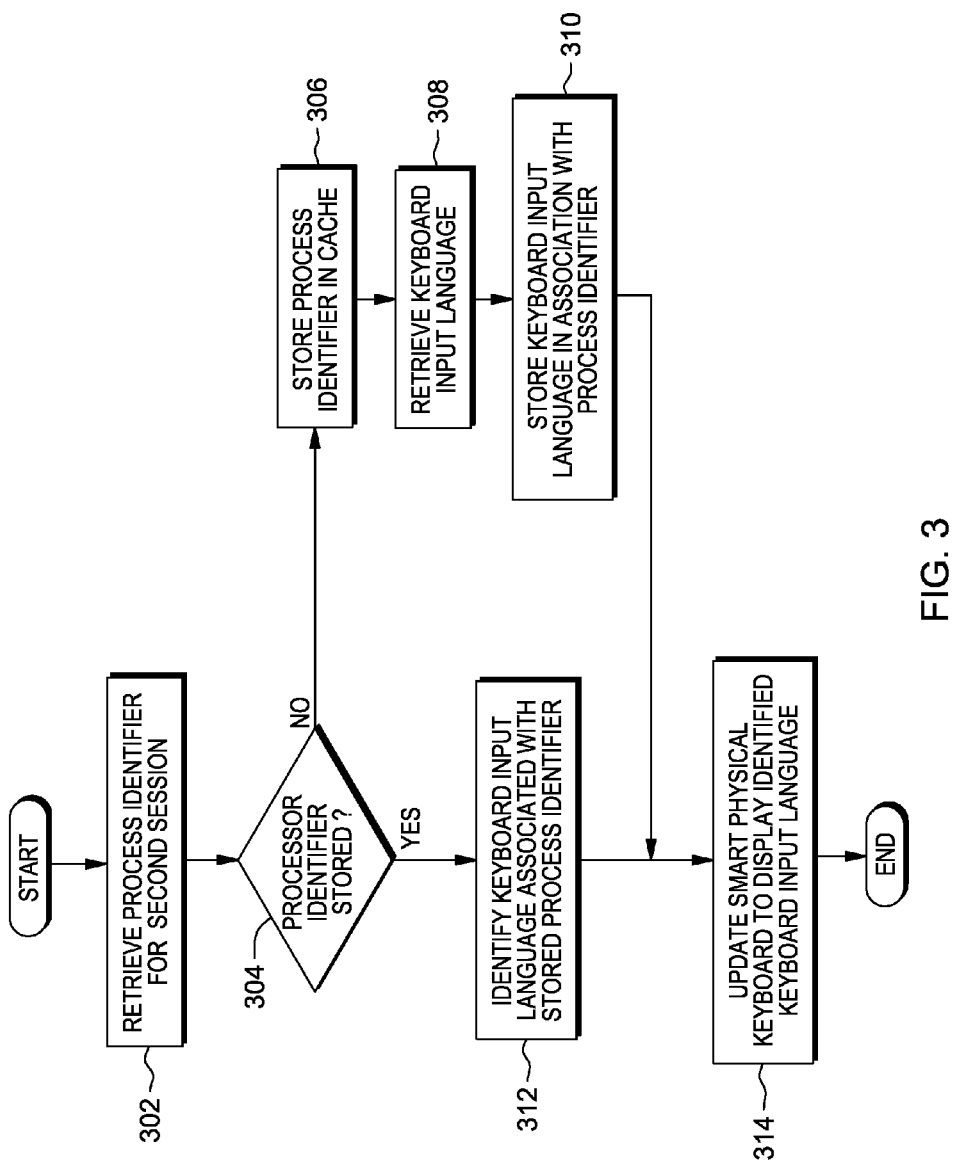
FIG. 3 is a flowchart illustrating the operations of the keyboard application for dynamically updating a graphical representation of each key of a smart physical keyboard in response to a user switching back and forth between the remote session and a second session, in accordance with an embodiment of the invention.

FIG. 3 is a flowchart illustrating the operations of keyboard application 114 in dynamically updating the graphical representation of a smart physical keyboard when switching back and forth between a remote session and a second session. Keyboard application 114 retrieves the process identifier of the second session assigned by local OS 116, once the second session becomes the active window (step 302). In an exemplary embodiment, keyboard application 114 receives an indication from local OS 116 that the active window has changed to the second session. Keyboard application 114 retrieves the process identifier assigned to the second session from local OS 116, the process identifier being a unique identifier within the confines of local device 110. In addition, in an exemplary embodiment, the second session can be either a local session or a second remote session. For example, if a user minimizes the initiated remote session from FIG. 2 and makes a local window the active window, keyboard application 114 retrieves the process identifier for the local window, i.e., the second session, from local OS 116. While in an exemplary embodiment, keyboard application 114 retrieves the process identifier assigned to the second session, in other embodiments, keyboard application can retrieve any unique identifier used to identify the second session.

Keyboard application 114 checks in local cache for a stored process identifier matching the process identifier assigned to the second session (decision 304). If there is a stored process identifier that matches the process identifier assigned to the second session (decision 304, "YES" branch), keyboard application 114 identifies the keyboard input language stored in association with the stored process identifier (step 312). Keyboard application 114 then updates smart physical keyboard 112 to display the identified keyboard input language (step 314). Therefore, in an exemplary embodiment, keyboard application 114 checks in local cache for a stored process identifier matching the retrieved process identifier for the local window, i.e., the second session. If the process identifier for the local window matches a stored process identifier, keyboard application 114 identifies the keyboard input language associated with the stored process identifier, which, for the local window, is local keyboard input language 117. Keyboard application 114 then updates smart physical keyboard 112 to display the keyboard layout described by local keyboard input language 117.

If there is no stored process identifier that matches the process identifier assigned to the second session (decision 304, "NO" branch), keyboard application 114 stores the process identifier in local cache (step 306). Keyboard application 114 retrieves the keyboard input language for the second session (step 308). The keyboard input language for the second session running on local device 110 is retrieved from a remote operating system when the second session is a second remote session, and from local OS 116, when the second session is a local session. Therefore, in an exemplary embodiment, if there is no stored process identifier matching the process identifier assigned to the local window, keyboard application 114 stores the process identifier for the local window in local cache and retrieves local keyboard input language 117 from local OS 116. In an alternate embodiment, only a keyboard input language identifier for the second session is retrieved. This alternate embodiment assumes that all noteworthy keyboard input languages are stored on local device 110, each having a universally unique keyboard input language identifier. Keyboard application 114 uses the keyboard input language identifier to identify the relevant keyboard input language.

Keyboard application 114 stores the keyboard input language for the second session in local cache in association with the process identifier stored in step 306 (step 310). Keyboard application 114 updates smart physical keyboard 112 to display the keyboard layout described by the identified relevant keyboard input language (step 314). For example, keyboard application 114 stores local keyboard input language 117 in local cache in association with the process identifier for the local window, i.e, the second session. Keyboard application 114 then updates smart physical keyboard 112 to display the keyboard layout described by local keyboard input language 117 on the keys of the smart physical keyboard.

The steps described in FIG. 3 are repeated again when switching back from the local window back to the initial remote session window. For example, if a remote session is minimized and a local window is the active window, keyboard application 114 updates smart physical keyboard 112 to display the keyboard layout described by local keyboard input language 117 on the keys of the smart physical keyboard. When the remote session is maximized and restored as the active window, keyboard application 114 retrieves the process identifier for the remote session and determines if the process identifier is stored in local cache. Since the process identifier for the remote session, discussed above, is already stored in local cache, keyboard application 114 utilizes the keyboard input language, remote keyboard input language 119, stored in association with the process identifier for the remote session, to update smart physical keyboard 112 to display the keyboard layout described by the remote keyboard input language on the keys of smart physical keyboard 112.

Figure 4:
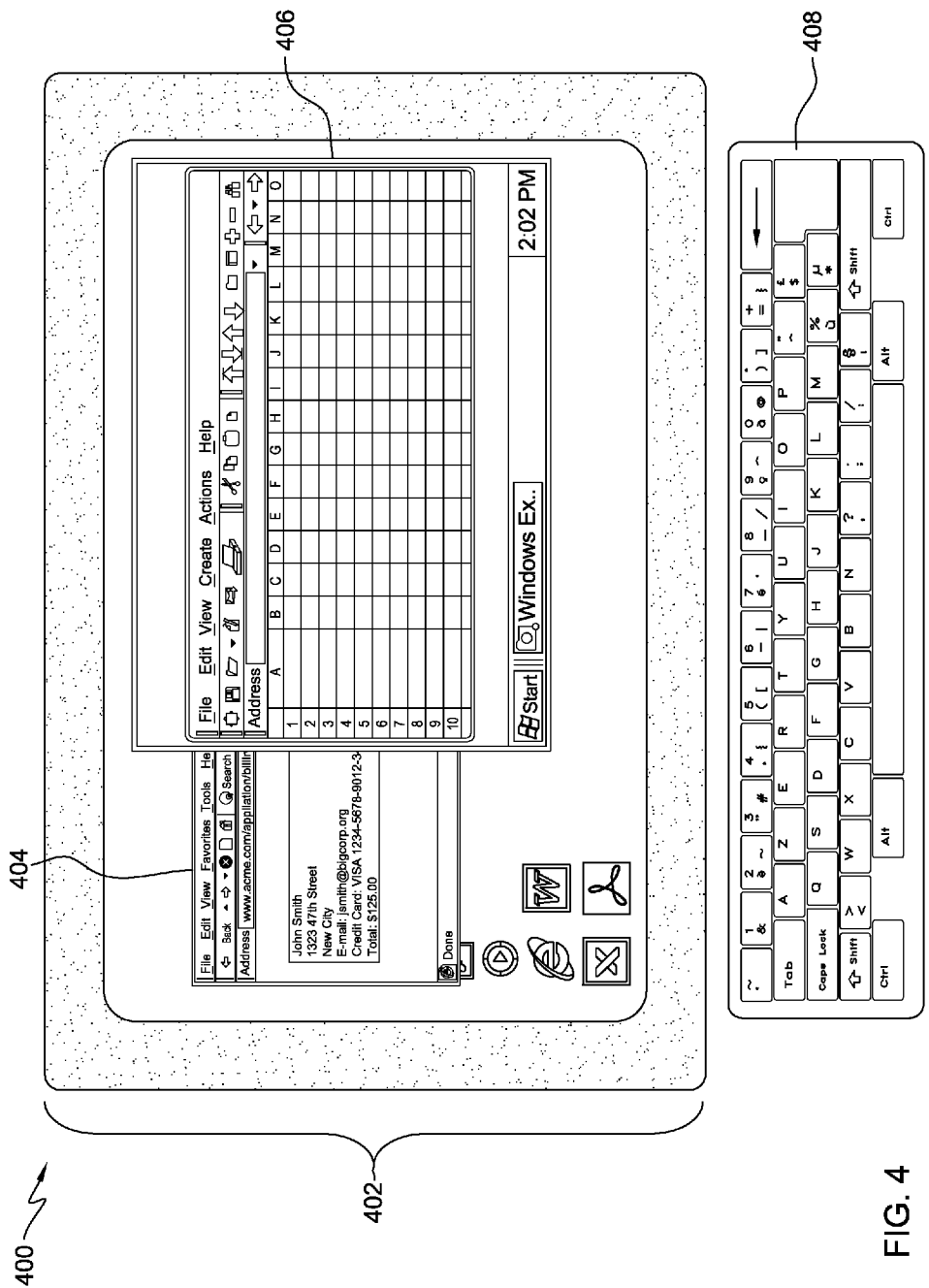
FIG. 4 illustrates a screenshot representation of the remote session as an active window, in accordance with an embodiment of the invention.

FIG. 4 illustrates display screen representation 400 that shows smart physical keyboard representation 408 and a screenshot of display screen 402 of local device 110 that includes local window 404 and remote session 406. As shown, remote session 406 is the active window. In this exemplary embodiment, keyboard application 114 is invoked once remote session 406 is initiated. Keyboard application 114 then retrieves the process identifier for remote session 406 from local OS 116 and stores the process identifier in local cache. Keyboard application 114 then retrieves remote keyboard input language 119, i.e., the remote keyboard input language for remote session 406, which in this example describes the "AZERTY" keyboard layout, from remote OS 118 and stores the remote keyboard input language in association with the retrieved process identifier. Keyboard application 114 then updates smart physical keyboard 112 resulting in smart physical keyboard representation 408 displaying an "AZERTY" keyboard layout on the keys of the smart physical keyboard.

Figure 5:
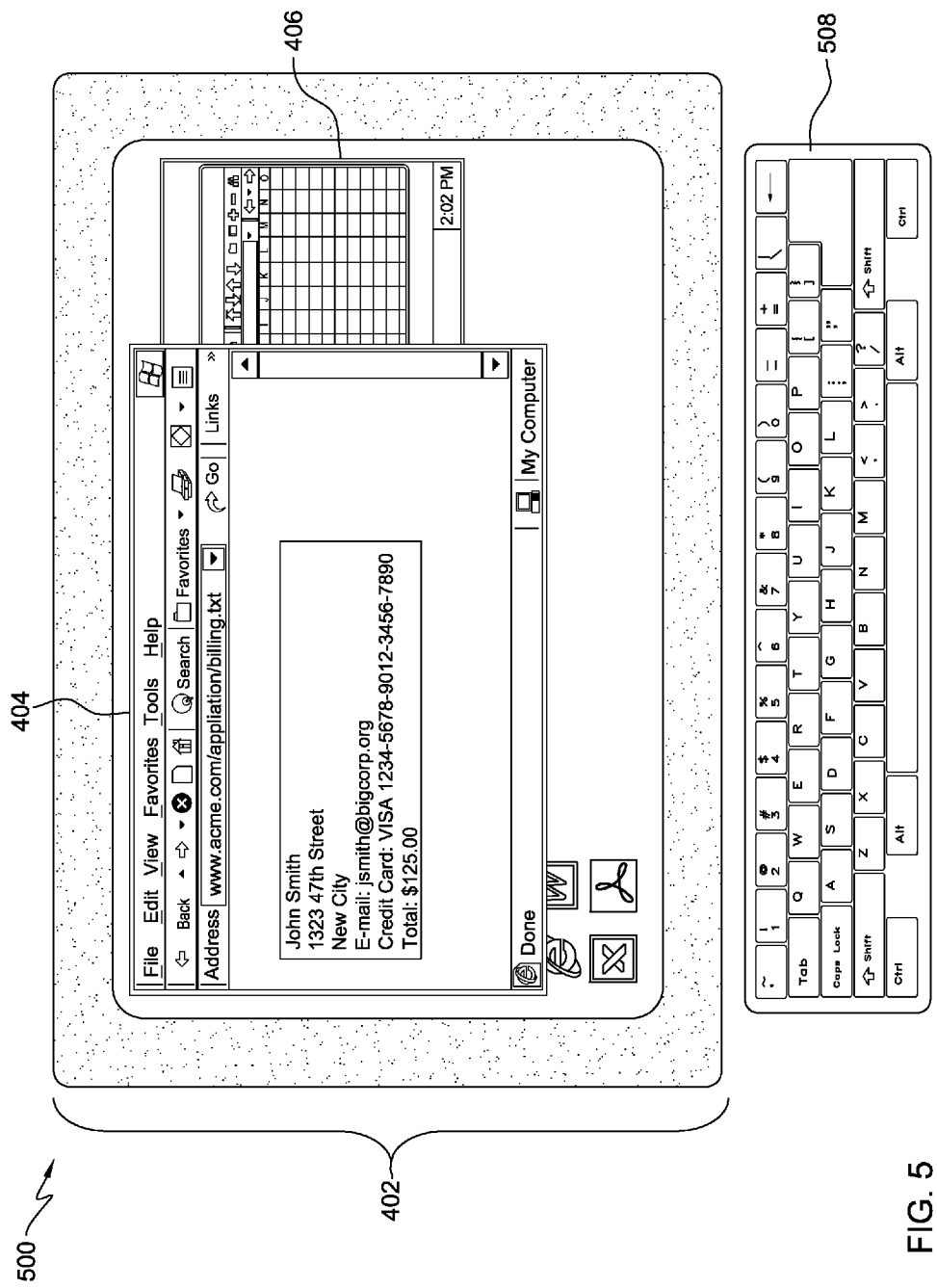
FIG. 5 illustrates a screenshot representation of a local window as the active window, in accordance with an embodiment of the invention.

FIG. 5 illustrates display screen representation 500 which shows smart physical keyboard representation 508 and a second screenshot of display screen 402 of local device 110 that includes local window 404 and remote session 406. As shown, local window 404 is the active window. In this exemplary embodiment, keyboard application 114 retrieves the process identifier for the active window, which in this example is local window 404, from local OS 116 and stores the process identifier in local cache. Keyboard application 114 then determines whether the process identifier for the active window, local window 404, matches a stored process identifier. If keyboard application 114 determines there is a matching stored process identifier, keyboard application 114 identifies the keyboard input language associated with the stored process identifier, i.e., local keyboard input language 117, which in this example describes the "QWERTY" keyboard layout. Keyboard application 114 updates smart physical keyboard 112 to display the keyboard layout described by local keyboard input language 117 resulting in smart physical keyboard representation 508 displaying a "QWERTY" layout on the keys of the smart physical keyboard.

If keyboard application 114 determines the process identifier for the active window, local window 404, does not match a stored process identifier, keyboard application 114 retrieves the keyboard input language for the active window/local window, i.e., local keyboard input language 117, from local OS 116 and stores the keyboard input language in association with the retrieved process identifier. Keyboard application 114 then updates smart physical keyboard 112 to display the keyboard layout described by local keyboard input language 117 resulting in smart physical keyboard representation 508 displaying a "QWERTY" layout on the keys of the smart physical keyboard.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 6:
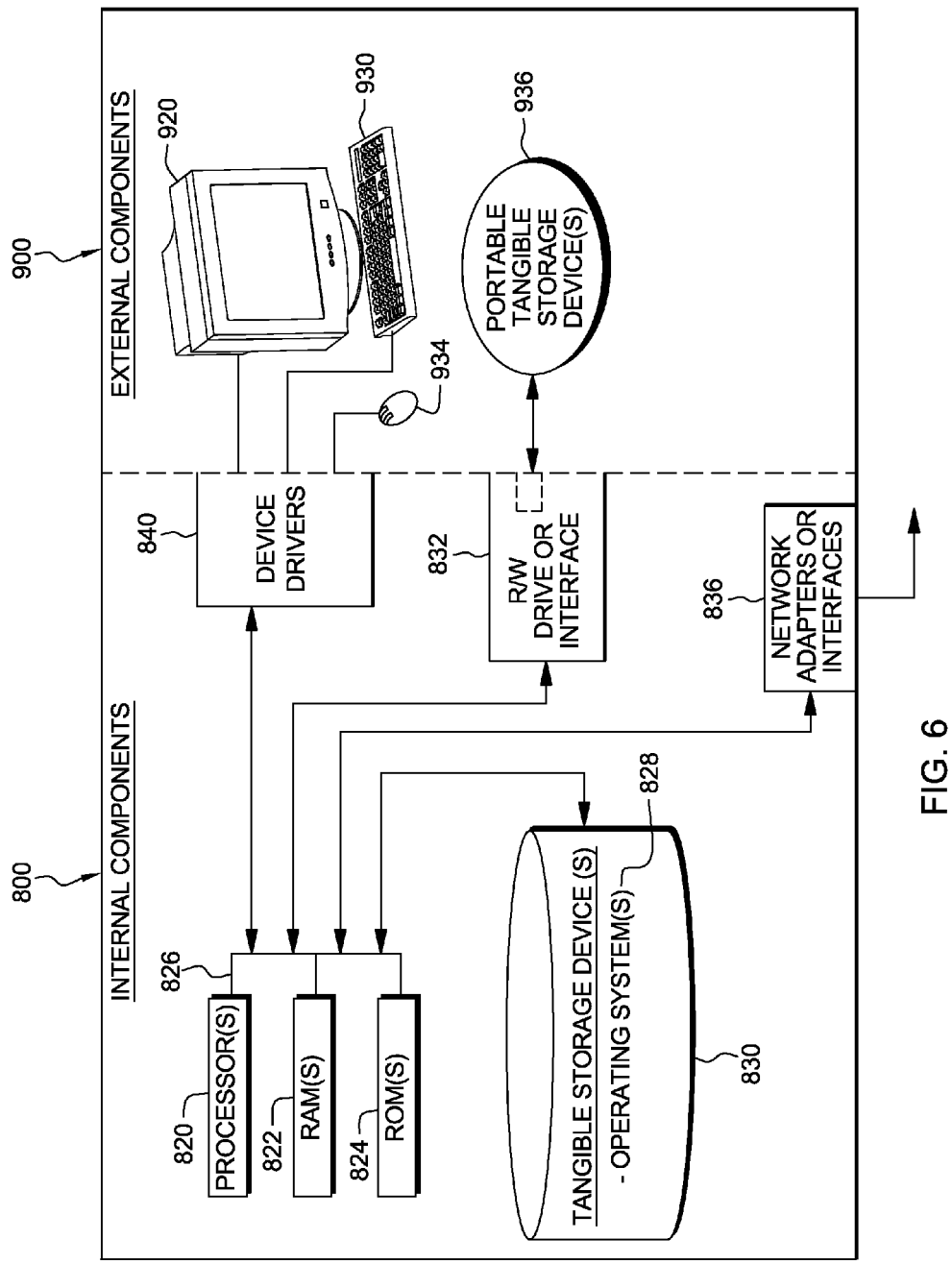
FIG. 6 is a block diagram depicting internal and external components of a computer having the keyboard application of FIG. 1, in accordance with an embodiment of the invention.

FIG. 6 shows a block diagram of the components of a computer system 800, 900, in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Computer system 800, 900 is representative of any electronic device capable of executing machine-readable program instructions. Computer system 800, 900 may be representative of a smart phone, a computer system, PDA, or other electronic devices. Examples of computing systems, environments, and/or configurations that may represented by computer system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Local device 110 and remote device 120 each include respective sets of internal components 800 and external components 900 illustrated in FIG. 6. Each of the respective sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, local OS 116, and programs keyboard application 114 and local keyboard input language 117 in local device 110; and the one or more operating systems 828, remote OS 118, and programs remote keyboard input language 119 in remote device 120 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs keyboard application 114 and local keyboard input language 117 in local device 110; and remote keyboard input language 119 in remote device 120 can be stored on one or more of the respective portable computer-readable tangible storage devices 936, read via the respective R/W drive or interface 832 and loaded into the respective hard drive 830.

Each set of internal components 800 also includes network adapters or interfaces 836 such as TCP/IP adapter cards, wireless wi-fi interface cards, or 3G or 4G wireless interface cards or other wired or wireless communication links. The programs keyboard application 114 and local keyboard input language 117 in local device 110; and remote keyboard input language 119 in remote device 120 can be downloaded to respective computers local device and remote device from an external computer via a network (for example, the Internet, a local area network or other, wide area network) and respective network adapters or interfaces 836. From the network adapters or interfaces 836, programs keyboard application 114 and local keyboard input language 117 in local device 110; and remote keyboard input language 119 in remote device 120 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. In one embodiment, keyboard 930 is smart physical keyboard 112. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for dynamically updating an input language of a smart physical keyboard, the method comprising the steps of:

a local computer receiving an indication that a first remote session has been started, wherein starting the first remote session includes the local computer accessing a first remote computer;
the local computer determining a first keyboard input language identifier for the first remote session, wherein a first keyboard input language identifier is a universal identifier comprising one or more alphanumeric characters associated with a first keyboard input language, and wherein the step of the local computer determining the first keyboard input language identifier for the first remote session includes the local computer retrieving the first keyboard input language identifier for the first remote session from the first remote computer;
the local computer determining a first keyboard input language for the first remote session by comparing the retrieved first keyboard input language identifier to a database comprising one or more keyboard input languages and corresponding keyboard input language identifiers;
the local computer updating one or more keys of a smart physical keyboard to display the first keyboard input language for the first remote session;
the local computer storing the first keyboard input language for the first remote session in association with a first process identifier corresponding to the first remote session, wherein the first process identifier comprises one or more alphanumeric characters that are analyzed by an operating system of the local computer in determining an active window of the local computer;
the local computer identifying a second session as an active window of the local computer;
the local computer updating one or more keys of a smart physical keyboard to display a second keyboard input language associated with the second session;
the local computer identifying the first remote session as an active window of the local computer;
the local computer identifying the first process identifier corresponding to the first remote session; and
the local computer updating one or more keys of a smart physical keyboard to display the first keyboard input language for the first remote session based on identifying the first process identifier corresponding to the active window of the local computer.

2. The method of claim 1, further comprising the steps of:
the local computer receiving an indication that the first remote session is an inactive window;
the local computer retrieving a process identifier for the active window;
the local computer determining a keyboard input language for the active window;
the local computer updating one or more keys of the smart physical keyboard to display the keyboard input language for the active window.

3. The method of claim 2, further comprising the steps of:
the local computer receiving an indication that the first remote session is the active window;
the local computer retrieving the first process identifier for the remote session;
the local computer determining the first keyboard input language that corresponds with the first process identifier for the first remote session; and
the local computer updating one or more keys of the smart physical keyboard to display the first keyboard input language that corresponds with the first process identifier for the first remote session.

4. The method of claim 1, further comprising:
the local computer determining that the first remote session has ended; and
the local computer deleting the first process identifier and the first keyboard input language.

5. The method of claim 1, wherein the second session is a remote session.

6. A computer program product for dynamically updating an input language of a smart physical keyboard, the computer program product comprising:
one or more computer-readable storage devices and program instructions stored on at least one of the one or more tangible storage devices, the program instructions comprising:
program instructions on a local computer to receive an indication that a first remote session has been started, wherein starting the first remote session includes the local computer accessing a first remote computer;
program instructions on the local computer to determine a first keyboard input language identifier for the first remote session, wherein a first keyboard input language identifier is a universal identifier comprising one or more alphanumeric characters associated with a first keyboard input language, and wherein the step of the local computer determining the first keyboard input language identifier for the first remote session includes the local computer retrieving the first keyboard input language identifier for the first remote session from the first remote computer;
program instructions on the local computer to determine a first keyboard input language for the first remote session by comparing the retrieved first keyboard input language identifier to a database comprising one or more keyboard input languages and corresponding keyboard input language identifiers;
program instructions on the local computer to update one or more keys of a smart physical keyboard to display the first keyboard input language for the first remote session;
program instructions on the local computer to store the first keyboard input language for the first remote session in association with a first process identifier corresponding to the first remote session, wherein the first process identifier comprises one or more alphanumeric characters that are analyzed by an operating system of the local computer in determining an active window of the local computer;
program instructions on the local computer to identify a second session as an active window of the local computer;
program instructions to update one or more keys of a smart physical keyboard to display a second keyboard input language associated with the second session;
program instructions to identify the first remote session as an active window of the local computer;
program instructions to identify the first process identifier corresponding to the first remote session; and
program instructions to update one or more keys of a smart physical keyboard to display the first keyboard input language for the first remote session based on identifying the first process identifier corresponding to the active window of the local computer.

7. The computer program product of claim 6, the program instructions further comprising:
program instructions on a local computer to receive an indication that the first remote session is an inactive window;

program instructions on a local computer to retrieve a process identifier for the active window;

program instructions on a local computer to determine a keyboard input language for the active window; and program instructions on a local computer to update one or more keys of the smart physical keyboard to display the keyboard input language for the active window.

8. The computer program product of claim 7, further comprising:

program instructions on the local computer to receive an indication that the first remote session is the active window;

program instructions on the local computer to retrieve the first process identifier for the first remote session;

program instructions on the local computer to determine a first keyboard input language that corresponds with the first process identifier for the first remote session; and program instructions on the local computer to update one or more keys of the smart physical keyboard to display the first keyboard input language that corresponds with the first process identifier for the first remote session.

9. The computer program product of claim 6, further comprising:

program instructions to determine that the first remote session has ended; and program instructions to delete the first process identifier and the first keyboard input language.

10. The compute program product of claim 6, wherein the second session is a remote session.

11. A computer system for dynamically updating an input language of a smart physical keyboard, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions on a local computer to receive an indication that a first remote session has been started, wherein starting the first remote session includes the local computer accessing a first remote computer;

program instructions on the local computer to determine a first keyboard input language identifier for the first remote session, wherein a first keyboard input language identifier is a universal identifier comprising one or more alphanumeric characters associated with a first keyboard input language, and wherein the step of the local computer determining the first keyboard input language identifier for the first remote session includes the local computer retrieving the first keyboard input language identifier for the first remote session from the first remote computer;

program instructions on the local computer to determine a first keyboard input language for the first remote session by comparing the retrieved first keyboard input language identifier to a database comprising one or more keyboard input languages and corresponding keyboard input language identifiers;

program instructions on the local computer to update one or more keys of a smart physical keyboard to display the first keyboard input language for the first remote session; and program instructions on the local computer to store the first keyboard input language for the first remote session in association with a first process identifier corresponding to the first remote session, wherein the first process identifier comprises one or more alphanumeric characters that are analyzed by an operating system of the local computer in determining an active window of the local computer;

program instructions on the local computer to identify a second session as an active window of the local computer;

program instructions to update one or more keys of a smart physical keyboard to display a second keyboard input language associated with the second session;

program instructions to identify the first remote session as an active window of the local computer;

program instructions to identify the first process identifier corresponding to the first remote session; and program instructions to update one or more keys of a smart physical keyboard to display the first keyboard input language for the first remote session based on identifying the first process identifier corresponding to the active window of the local computer.

12. The computer system of claim 11, further comprising:

program instructions on the local computer to receive an indication that the first remote session is an inactive window;

program instructions on the local computer to retrieve a process identifier for the active window;

program instructions on the local computer to determine a keyboard input language for the active window; and program instructions on the local computer to update one or more keys of the smart physical keyboard to display the keyboard input language for the active window.

13. The computer system of claim 12, further comprising:

program instructions on the local computer to receive an indication that the first remote session is the active window;

program instructions on the local computer to retrieve the first process identifier for the first remote session;

program instructions on the local computer to determine a first keyboard input language that corresponds with the first process identifier for the first remote session; and program instructions on the local computer to update one or more keys of the smart physical keyboard to display the first keyboard input language that corresponds with the first process identifier for the first remote session.

14. The computer system of claim 11, wherein the second session is a remote session.

15. The computer system of claim 11, further comprising:

program instructions to determine that the first remote session has ended; and program instructions to delete the first process identifier and the first keyboard input language.

* * * * *